US 6,912,786 B2

(12) United States Patent
Jinkins et al.

(10) Patent No.: US 6,912,786 B2
(45) Date of Patent: Jul. 5, 2005

(54) HERRINGBONE GEAR TEETH AND METHOD FOR MANUFACTURING SAME

(75) Inventors: David L. Jinkins, Lufkin, TX (US); Kenneth O. Beckman, Lufkin, TX (US); Scott A. Franks, Lufkin, TX (US); Arthur L. Nelson, Lufkin, TX (US)

(73) Assignee: Lufkin Industries, Inc., Lufkin, TX (US)

( * ) Notice: Subject to any disclaimer, the term of this patent is extended or adjusted under 35 U.S.C. 154(b) by 0 days.

(21) Appl. No.: 10/638,002

(22) Filed: Aug. 8, 2003

(65) Prior Publication Data

US 2004/0031152 A1 Feb. 19, 2004

Related U.S. Application Data

(60) Provisional application No. 60/402,266, filed on Aug. 8, 2002.

(51) Int. Cl.[7] .......................... B21D 53/28; F16H 55/22
(52) U.S. Cl. ..................... 29/893.35; 29/893.3; 74/458
(58) Field of Search ........................... 29/893.35, 893.3, 29/888.023, 893.31, 892.2; 74/458; 409/25, 10–13; 407/26

(56) References Cited

U.S. PATENT DOCUMENTS

| 1,443,837 A | 1/1923 | Eberhardt |
| 1,490,457 A | 4/1924 | Eberhardt |
| 1,496,221 A | * 6/1924 | Head ........................... 409/44 |
| 3,531,976 A | 10/1970 | Fuhrman |
| 3,891,474 A | 6/1975 | Grange |
| 4,108,018 A | 8/1978 | John et al. |
| 6,283,686 B1 | 9/2001 | Gill |
| 6,449,845 B1 | * 9/2002 | Specht et al. .............. 29/892.2 |

OTHER PUBLICATIONS

Spice, Jason J., et al "Optimized Carburized Steel Fatigue Performance as Assessed With Gear and Modified Brugger Fatigue Tests", Society of Automotive Engineers, Inc., 2002, 2002-01–1003.

QM Technologies *"IBEST Treatment of Precision and Specialized Gears: Does Your Precision and Specialized Gears Require Improved Surfaces? An IBEST Application Success Nov. 1999"* 2000. http://www.qminc.com/Precision-Gears.htm (Jul. 10, 2003).

* cited by examiner

Primary Examiner—Marc Jimenez
(74) Attorney, Agent, or Firm—Gary L. Bush; Andrews Kurth LLP

(57) ABSTRACT

A method of manufacturing herringbone gears starting with non-hardened cylindrical stock material, establishing a relief notch for each tooth in the cylindrical stock where the two helices meet, roughing the double helical teeth, and case-hardening the gear teeth. The teeth are then finished using high accuracy Cubic Borzon Nitride (CBN)-faced cutters with the relief notch allowing run-out of the cutters.

13 Claims, 4 Drawing Sheets

HERRINGBONE GEAR TEETH AND METHOD FOR MANUFACTURING SAME

CROSS REFERENCE TO RELATED APPLICATION

This application is based upon provisional application 60/402,266 filed on Aug. 8, 2002, the priority of which is claimed.

BACKGROUND OF THE INVENTION

1. Field of the Invention

This invention relates generally to gear teeth, in particular herringbone gear teeth and improvements in methods for their manufacture.

2. Description of the Prior Art

Helical gears, which have teeth cut at an acute angle to the axis, are designed to have numerous teeth meshing at all points of rotation and to distribute pressure evenly along the entire length of each tooth. Thus, they provide smooth operation and reliability, and they are ideal for power transmission applications. Because of the angle of the teeth on a single helix gear (also referred to as a twisted spur gear), an axial thrust is created, but by using two opposing helices at complementary angles, induced axial thrust is eliminated.

The performance of a precision gear is largely determined by tooth accuracy and surface characteristics. In many cases, the gear surfaces are case hardened by a carburization, nitriding or similar process and subsequently finish machined to a glossy polish. Case hardening improves wear and corrosion resistance, enhances surface uniformity and purity, and induces a residual compressive stress, leading to significant improvements in gear performance and life. Furthermore, the physical properties of case-hardened steel are extremely good, capable of transmitting twice the torque as through-hardened gears.

Double helical gearing can generally be categorized into two types—the herringbone gear, where the two helices meet in the center to form continuous gear teeth as shown in FIG. 1, and the conventional double helical gear, with a relief gap between the two helices as shown in FIG. 2.

Herringbone gears (FIG. 1) are used as pump rotors and as power transmission gears in applications which require high torque with lower speed, particularly where the face width of the gearing is limited. Although continuous beam double helical gearing has been in use for over fifty years, the hardness of the parts and the tooth dimension accuracy has been limited due to manufacturing difficulties inherent in machining the teeth at the apex.

Herringbone gears have been limited to manufacture by Sykes gear generators or shapers, in which the two opposing helices are machined simultaneously by reciprocating cutters which alternately cut the left and then the right helix with each machine strike. The cutters cut the tooth profile as they stroke to the of the center of the gear face. A limitation to this process is the scarcity of large-pitch high-accuracy Sykes cutters. Further, because these cutters can not cut metals of hardness greater than 35 Rockwell C, the finishing process is limited to through-hardened gearing. The tooth finishing process is equally inaccurate and statistically unpredictable.

Contrarily, conventional double helical gears, as shown in FIG. 2, do not suffer the limitations of herringbone gears. Because the relief gap allows the cutter centerline to travel beyond the end of each helix, a variety of high accuracy machine tools, including some capable of machining hardened steel much greater than 58 Rockwell C, can be used to cut and finish these gears. Therefore, conventional double helical gears with relief gaps are more commonly used in high performance applications than herringbone gears.

Unfortunately for pumping applications, gears with a relief gap are unsuitable for use as pump rotors, so herringbone gears, with their hardness and case depth limitations, must be used. These gears are typically finish cut then nitrided, providing a 0.020 inch to 0.025 inch case. Since nitriding takes place at elevated temperatures, surface irregularities are induced due to distortion. The shortcomings directly affect pump performance. For example, herringbone gears used in plastic melt pumps are subject to case flaking on tooth surfaces due to shallow case depth, overloading pressures, or tooth error from inaccuracies inherent in machining.

A herringbone gear with improved hardening and tooth quality is desired.

IDENTIFICATION OF OBJECTS OF THE INVENTION

A primary object of the invention is to provide a double helical herringbone gear of the form of FIG. 1 by starting with non-hardened cylindrical stock material, forming a continuous beam across the face of the gear, and then carburizing the gear and finishing it to the high accuracy characteristic of the conventional gapped double helical carburized gears of FIG. 2.

Another object of the invention is to provide a method for manufacturing a gear especially manufactured for use as a rotor for a plastic melt pump, that has been heat treated to 58–62 Rockwell C hardness and finished on one or more accurate gear manufacturing cutters to American Gear Manufacturers Association (AGMA) Quality gearing of generally six times more precise than previous continuous beam teeth.

SUMMARY OF THE INVENTION

The objects identified above as well as other features and advantages are provided in a method of manufacturing herringbone gears starting with non-hardened cylindrical stock material. A relief notch for each tooth is established in the cylindrical stock where the two helices meet. Next, the double helical teeth are roughed and the gear is case-hardened. By using the carburizing method, deeper cases (0.200 inch to 0.025 inch) can be obtained. The teeth are then finished using high accuracy Cubic Borzon Nitride (CBN)-faced cutters with the relief notch allowing run-out of the cutters.

BRIEF DESCRIPTION OF THE DRAWINGS

The invention is described in detail hereinafter on the basis of the embodiments represented schematically in the accompanying figure, in which.

DESCRIPTION OF THE PREFERRED EMBODIMENT OF THE INVENTION

Figure 1:
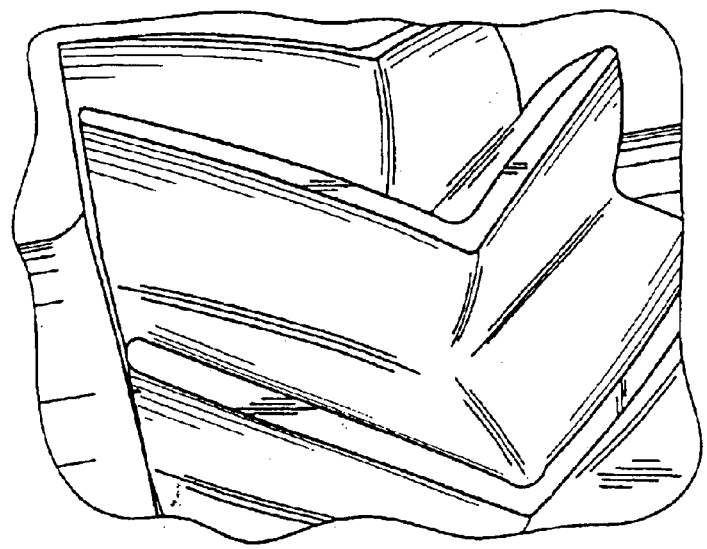
FIG. 1 is a perspective view of a prior art herringbone gear fabricated from relatively soft steel of hardness less than about 35 Rockwell C.
Figure 2:
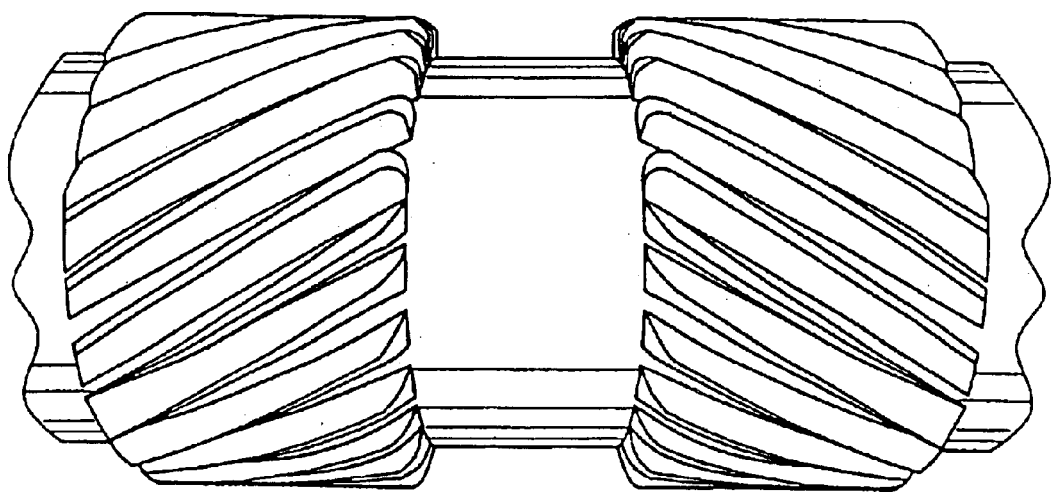
FIG. 2 is a perspective view of a prior art conventional double helix gear with a gap between the helices, but fabricated from carburized hardened steel of hardness greater than 35 Rockwell C.
Figure 3:
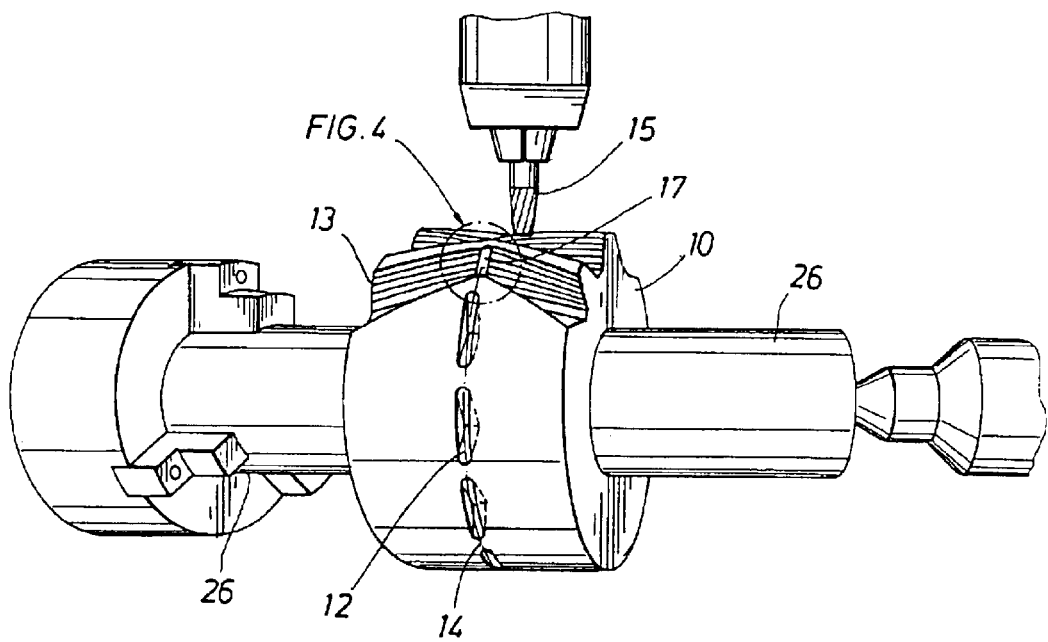
FIG. 3 is an illustration showing initial roughing of unhardened cylindrical stock according to the invention.

Referring to FIG. 3, the method according to the invention begins with machining of unhardened high quality steel stock 10 to develop the cylindrical features of the gear part. Next a series of relief notches 12 is machined for each tooth 13 in the gear. The relief notches 12 allow tool run-out in the subsequent finishing process. While the Sykes-cut herringbone gear has a slight furrow at the acute intersection of the two helices formed from the cutting action of the gear generator, the furrow does not provide sufficient clearance for finishing process of this invention.

Relief notches 12 are generated by machining a series of involute cuts in the part at the apex 14 (where the helices meet) between each two adjacent teeth 13 around the circumference of the part 10. A relief notch 12 is initially machined in the center of the gear face, the apex 14. The part 10 is rotated a pre-determined amount and the milling head 15 is indexed axially an amount to duplicate the helix angle of the tooth. The milling head 15 is then moved to a point on the other side of the face center line 14 to machine a similar tool path. The part is rotated again, and two more tool paths are machined at locations progressively farther from the gear face center line 14. This process is repeated until an adequate relief notch 12 is formed that allows the required tool run-out into the interior corners 17 of the gear teeth. As FIG. 3 shows, all of the relief notches 12 may first be formed, and afterwards the gear teeth 13 roughed; or each gear tooth 13 may be roughed immediately following the machining of its corresponding relief notch 12.

Figure 4:
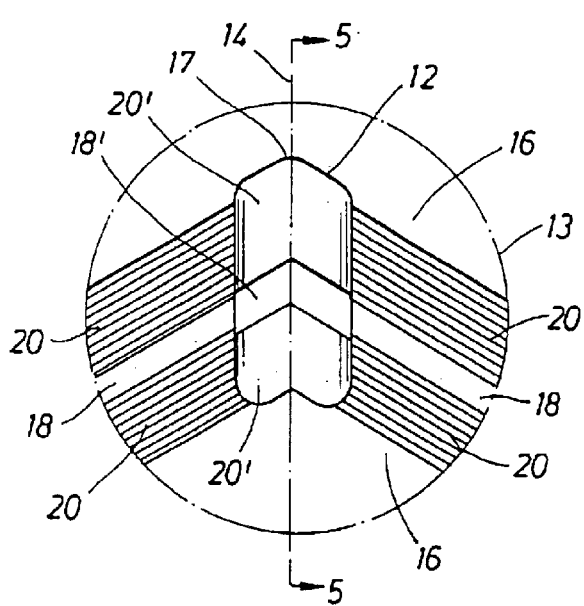
FIG. 4 is a magnified view of FIG. 3, showing a plan view of the relief notch according to the invention.
Figure 5:
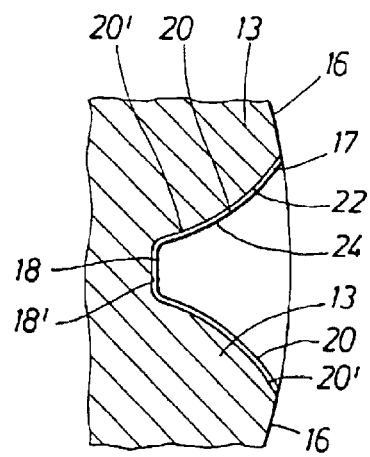
FIG. 5 is a cross section taken along lines 5—5 of FIG. 4.

FIGS. 4 and 5 describe the shape and profile of each relief notch 12. Relief notch 12 is located at apex 14 between the top lands 16 of two adjacent teeth 13. The bottom land 18 and each tooth surface 20 is shown for both helices. Relief notch 12 has a profile 22 similar to the involute tooth profile 24, but slightly larger and deeper. The notch bottom land 18' and surfaces 20' are indicated.

Because the relief notch profile 22 is slightly larger than the profile 24 of the finished tooth, during the subsequent finishing process, when the finishing cutter strokes into the relief notch 12, there will be no stock removal.

Figure 6:
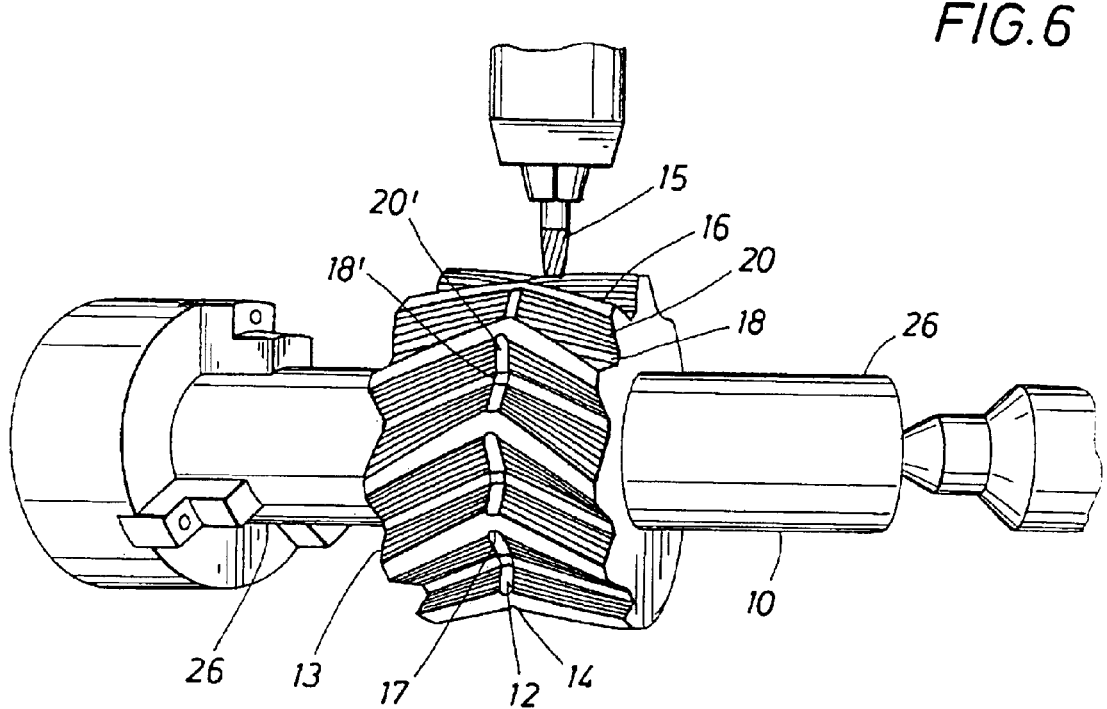
FIG. 6 is an illustration showing mill roughing of a herring bone gear according to the invention.
Figure 7:
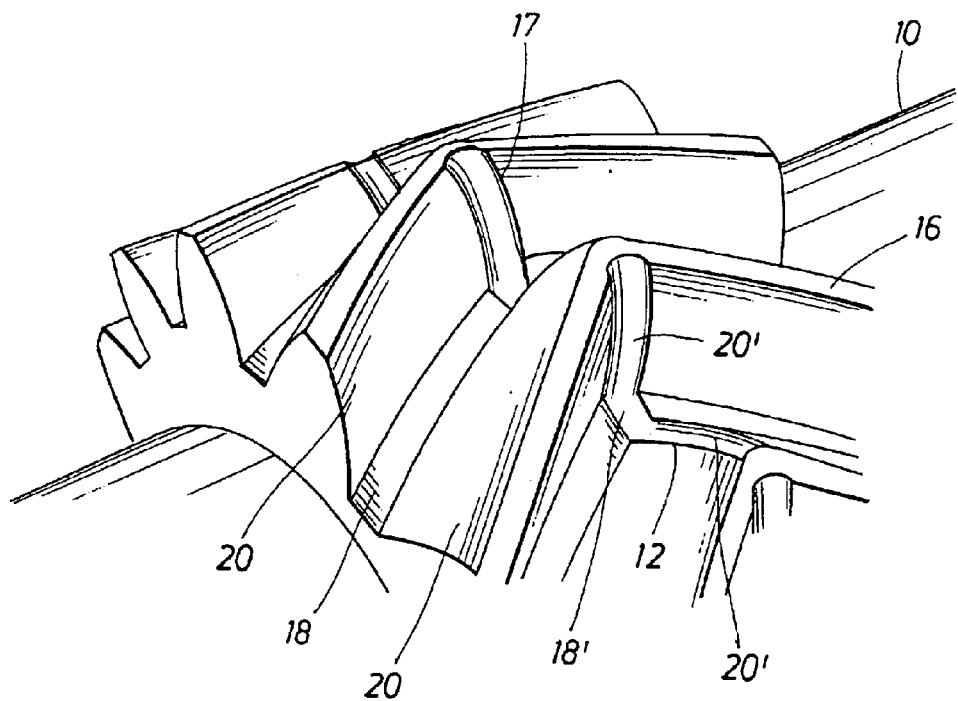
FIG. 7 is an illustration showing the gear after all roughing operations are completed.

As shown in FIG. 6, gear teeth roughing is accomplished by use of a mill which results in a stair-step approximation of the gear tooth involute profile. The stair stepping effect is then removed by a Maag cutter and/or a rack-type roughing shaper-cutter, yielding smooth gear teeth within about 0.020 inches of the desired finish profile 24 (see FIG. 5), as shown in FIG. 7.

After the herringbone gear is roughed out, it is carburized to a case hardness of about 58–62 Rockwell C. The preferred method is to use a two stage carburizing process. The gear teeth 13 are first carburized and cleaned. Then, both the gear teeth 13 and the journals 26 are exposed to carburizing atmosphere. The case minimum case depth should be 0.200 to 0.300 inches in the tooth region and 0.040 inches deep in the bearing journals. This is achieved by masking the bearing journals during a portion of the carburizing cycle.

Figure 8:
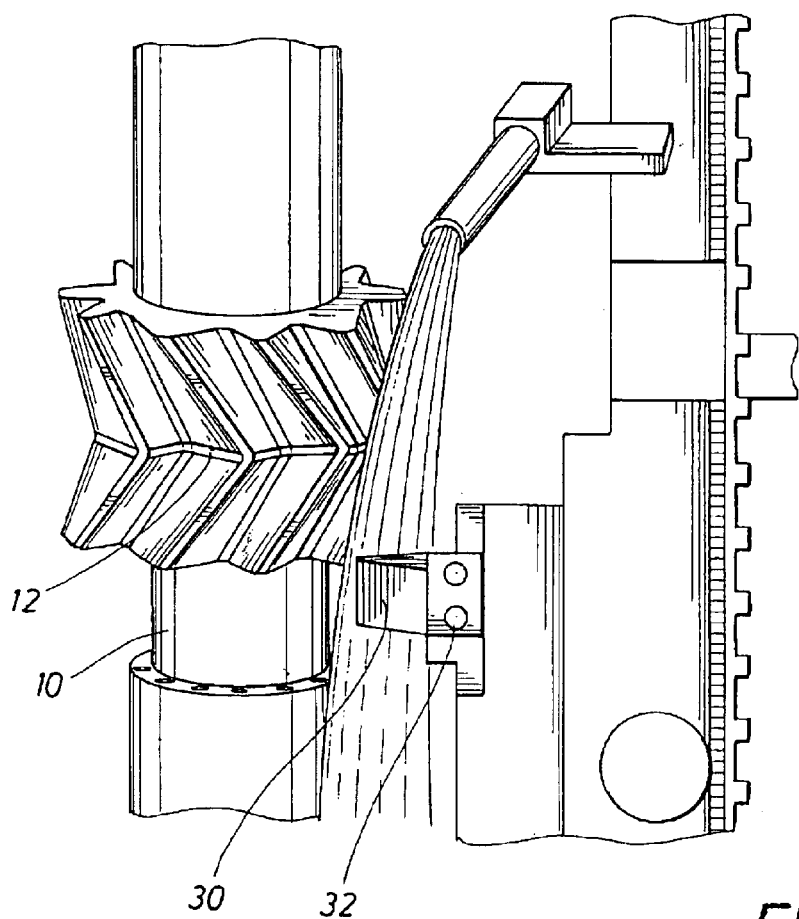
FIG. 8 is an illustration showing the finishing operation using a Cubic Borzon Nitride cutter.

After carburization, as shown in FIG. 8, the part is finished using a high-accuracy reciprocating insert cutter 30 faced with Cubic Borzon Nitride (CBN). Historically this finishing technique requires a gap that is about 1" wide between the helices for tool run-out, but by using a special cutter 30 this run-out is minimized. CBN Cutter 30 is also held by a special tool post 32 for a reduced rake angle. Stock 10 is rotatively indexed while cutter 30 strokes into the gear removing around 0.020 inches of case-hardened material. Relief notch 12 allows cutter 30 run-out; no material is removed by cutter 30 in notch 12. Because the relief notch 12 is machined between the teeth 13 as described above, the two helices can be joined and still leave the required clearance for finishing tool run-out.

A CBN blade-type cutter 30 provides exceptional finish, is long wearing, reduces cutting force and is readily available. Further, because of the flat cutting surface of cutter 30 and the kinematics of the Maag gear cutter, the involute is generated, and gear involute accuracy is not dependent on indexing or tool accuracy.

Figure 9:
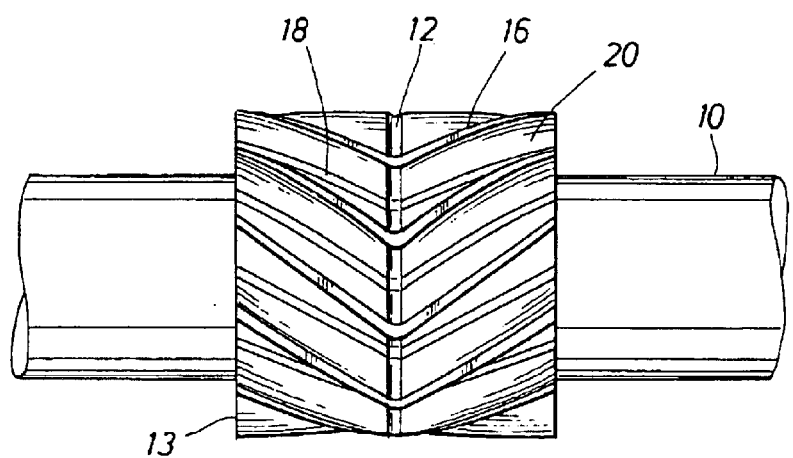
FIG. 9 is an illustration showing a case-hardened, finished herringbone gear with relief notches according to the invention.

FIG. 9 shows a herringbone gear manufactured according to the invention. The manufacturing method described above allows the herringbone teeth to be finished with higher accuracy, because they are hardened, and formed by a more modern machine tool with the improved CBN cutter. Tooth accuracy is greatly enhanced by finishing teeth with a hardened tool. Prior art machining of relatively soft steel provides an accuracy of profiles that are within 0.0024 inches and helix angles are within 0.004 degrees (lead variation of 0.008 inches). The accuracy of the teeth measurements achievable, when using the invention, is about ten times better, with profile error less than 0.00026 inches and lead variation of 0.00044 inches. Further, the tooth surface finish can reach 20 to 24 RMS without sacrificing tooth accuracy. Further, gears manufactured according to this process meet increased AGMA service factors and ratings for allowable contact stress and bending stress for carburized gears. Specifically, AGMA Contact Stress Number can reach 225,000 psi, Bending Stress Number can reach 65,000 psi.

As a result, the quality of herringbone gears produced by this invention is now equivalent to that of conventional double helix gears with a relief gap. The invention allows the use of more modern machine tools for faster and more accurate manufacturing.

While preferred embodiments of the invention have been illustrated in detail, it is apparent that modifications and adaptations of the preferred embodiments will occur to those skilled in the art. It is to be expressly understood that such modifications and adaptations are in the spirit and scope of the invention as set forth in the following claims:

What is claimed is:

1. A process for manufacturing herringbone gears comprising the steps of:
   forming cylindrical features on a stock,
   forming a plurality of relief notches around a circumference of a circle perpendicular to an axis of said cylindrical features,
   roughing a plurality of double helical gear teeth along a helix angle on said stock, with each of said plurality of double helical gear teeth characterized by having an apex located at said circumference and corresponding to one of said plurality of relief notches, then hardening said plurality of double helical gear teeth, and after said hardening, finishing each of said plurality of double helical gear teeth to a finish profile with a cutter, wherein said corresponding relief notch allows travel of said cutter necessary for said finishing step without said cutter removing said stock therein.

2. The process of claim 1 wherein, said plurality of relief notches are formed into a relief profile deeper than said finish profile.

3. The process of claim 2 wherein, said relief profile is an involute profile.

4. The process of claim 1 wherein, each of said plurality of relief notches extends symmetrically outwards from said circumference along said helix angle.

5. The process of claim 1 wherein, said hardening step include a carburization process.

6. The process of claim 5 wherein, said finishing step is performed by a Cubic Borzon Nitride-faced cutter.

7. The process of claim 5 wherein said carburization process includes the steps of, carburizing said plurality of double helical gear teeth, and then carburizing bearing journals and said plurality of double helical gear teeth.

8. The process of claim 5 wherein, said hardening step results in a case hardness of at least 58 Rockwell C.

9. The process of claim 1 wherein, said finishing step produces a finish profile that is an involute profile.

10. The process of claim 1 wherein, said stock is unhardened.

11. The process of claim 1 wherein, said roughing step is performed by a mill.

12. The process of claim 1 wherein, said roughing step is performed by a Maag cutter.

13. The process of claim 1 wherein, said roughing step is performed by a rack-type roughing shaper cutter.

* * * * *

UNITED STATES PATENT AND TRADEMARK OFFICE
CERTIFICATE OF CORRECTION

PATENT NO. : 6,912,786 B2
DATED : July 5, 2005
INVENTOR(S) : Jinkins et al.

It is certified that error appears in the above-identified patent and that said Letters Patent is hereby corrected as shown below:

Column 1,
Line 57, delete the words "of the".

Column 3,
Line 38, delete the words "comers" and insert the word -- corners --.

Signed and Sealed this

Eleventh Day of October, 2005

JON W. DUDAS
*Director of the United States Patent and Trademark Office*